United States Patent
Fujiwaka

(10) Patent No.: US 8,805,920 B2
(45) Date of Patent: Aug. 12, 2014

(54) INFORMATION PROCESSING APPARATUS, INFORMATION PROCESSING SYSTEM, INFORMATION PROCESSING METHOD AND PROGRAM STORAGE MEDIUM

(75) Inventor: Masaya Fujiwaka, Tokyo (JP)

(73) Assignee: NEC Corporation, Tokyo (JP)

( * ) Notice: Subject to any disclaimer, the term of this patent is extended or adjusted under 35 U.S.C. 154(b) by 171 days.

(21) Appl. No.: 13/148,842

(22) PCT Filed: Feb. 16, 2010

(86) PCT No.: PCT/JP2010/052587
§ 371 (c)(1),
(2), (4) Date: Aug. 10, 2011

(87) PCT Pub. No.: WO2010/095731
PCT Pub. Date: Aug. 26, 2010

(65) Prior Publication Data
US 2011/0314076 A1 Dec. 22, 2011

(30) Foreign Application Priority Data
Feb. 19, 2009 (JP) .................................. 2009-036483

(51) Int. Cl.
*G06F 15/16* (2006.01)

(52) U.S. Cl.
USPC ........................................................ 709/201

(58) Field of Classification Search
USPC ......................................... 709/201, 202, 203
See application file for complete search history.

(56) References Cited

U.S. PATENT DOCUMENTS

2008/0184274 A1* 7/2008 Ohta et al. ..................... 719/319

FOREIGN PATENT DOCUMENTS

| JP | 2007034687 A | 2/2007 |
| JP | 2007133713 A | 5/2007 |
| JP | 2008210071 A | 9/2008 |
| WO | 2008111448 A | 9/2008 |

OTHER PUBLICATIONS

International Search Report for PCT/JP2010/052587 mailed Apr. 27, 2010.

* cited by examiner

*Primary Examiner* — Larry Donaghue
*Assistant Examiner* — Marshall McLeod
(74) *Attorney, Agent, or Firm* — Sughrue Mion, PLLC

(57) ABSTRACT

In order that the application in the client terminal can be used continuously without being suspended temporarily, an information processing apparatus includes first processing means and a second processing section. That is, the information processing apparatus communicates via a network with a server including a first processing section of second processing means which including the first and the second processing section. The first processing means switches processing means which executes an application to either of the first or the second processing means. The second processing section executes a processing received from the first processing section, in case that the processing means is switched from the first processing means to the first processing section.

4 Claims, 4 Drawing Sheets

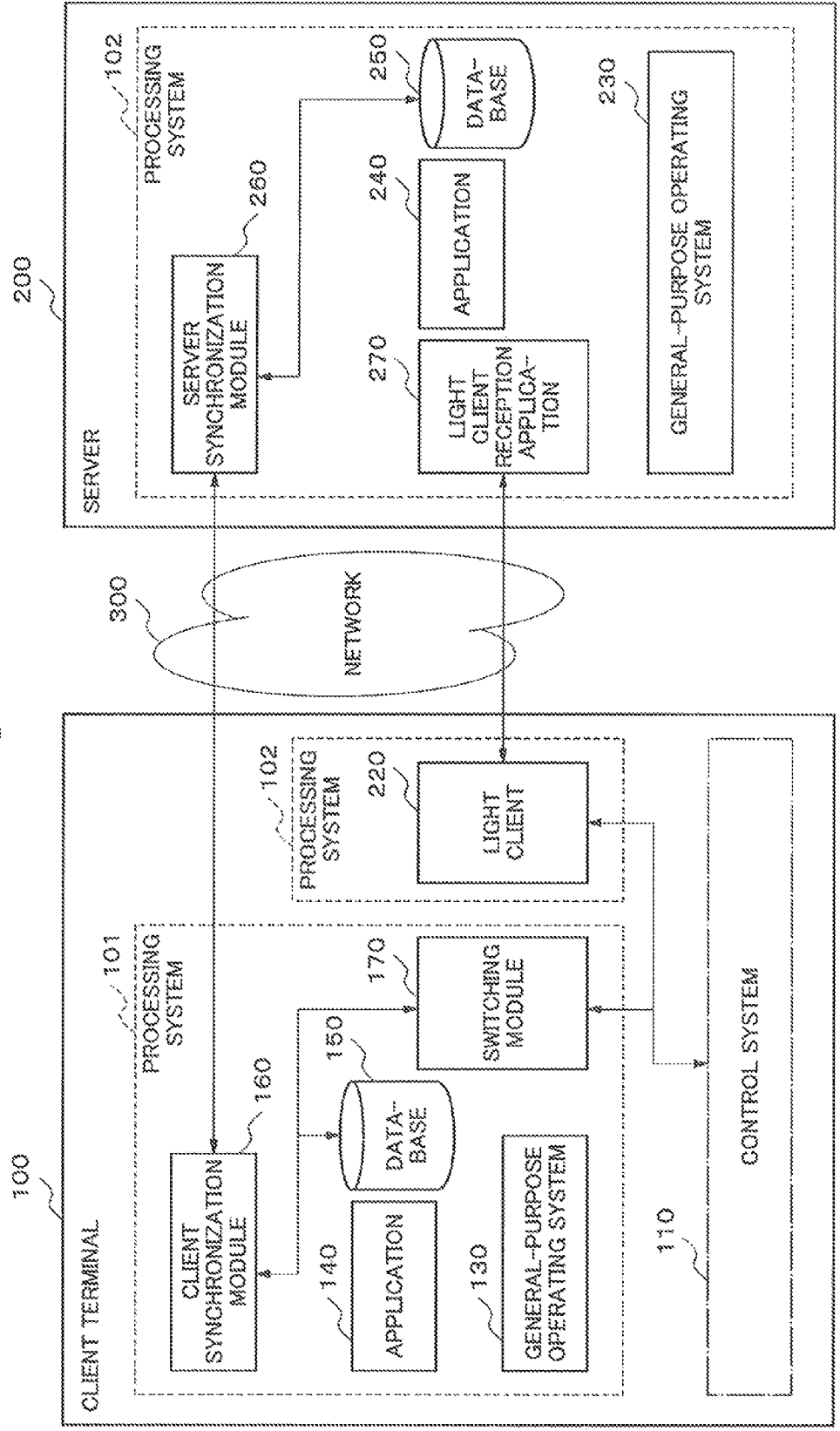

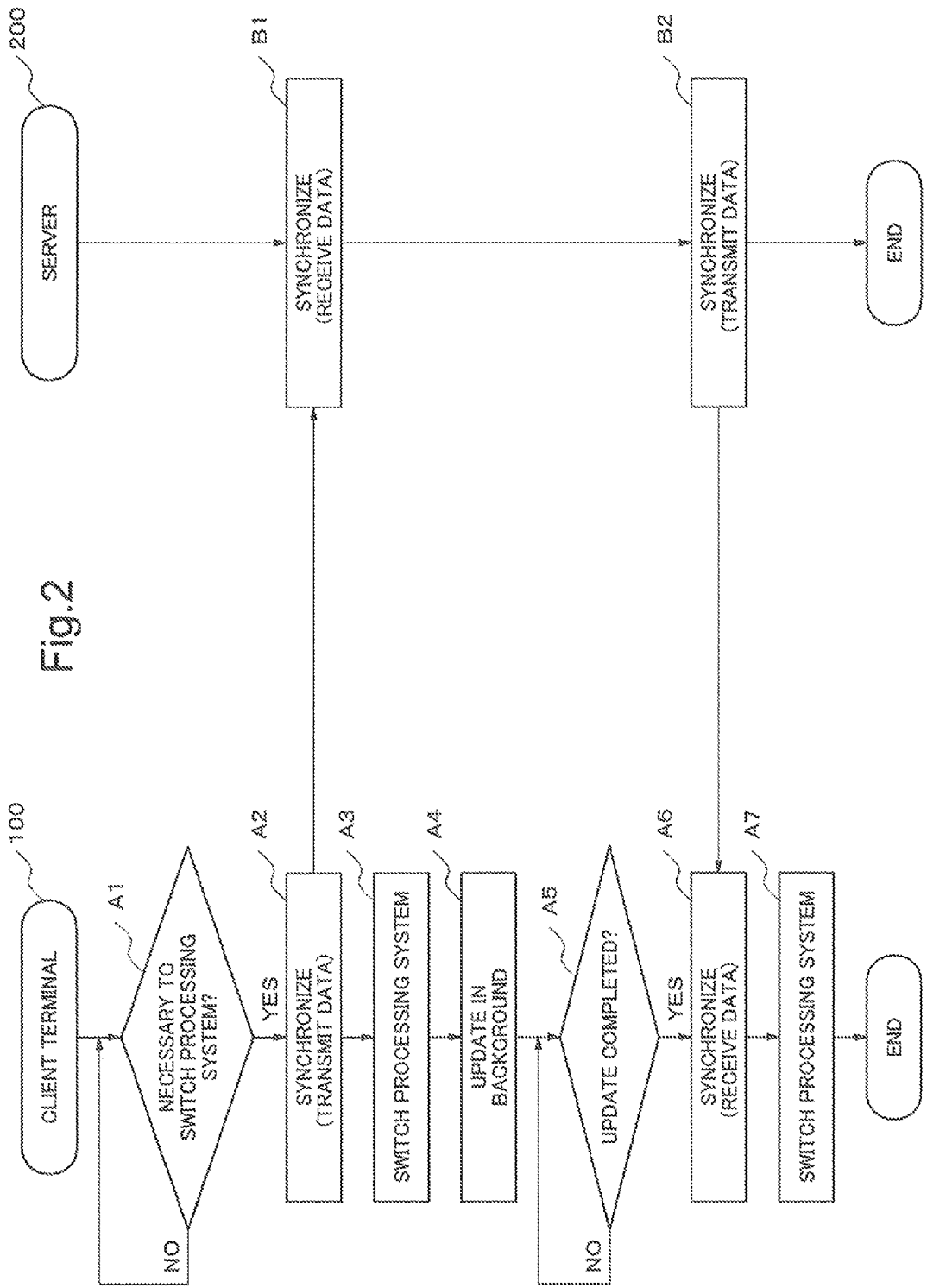

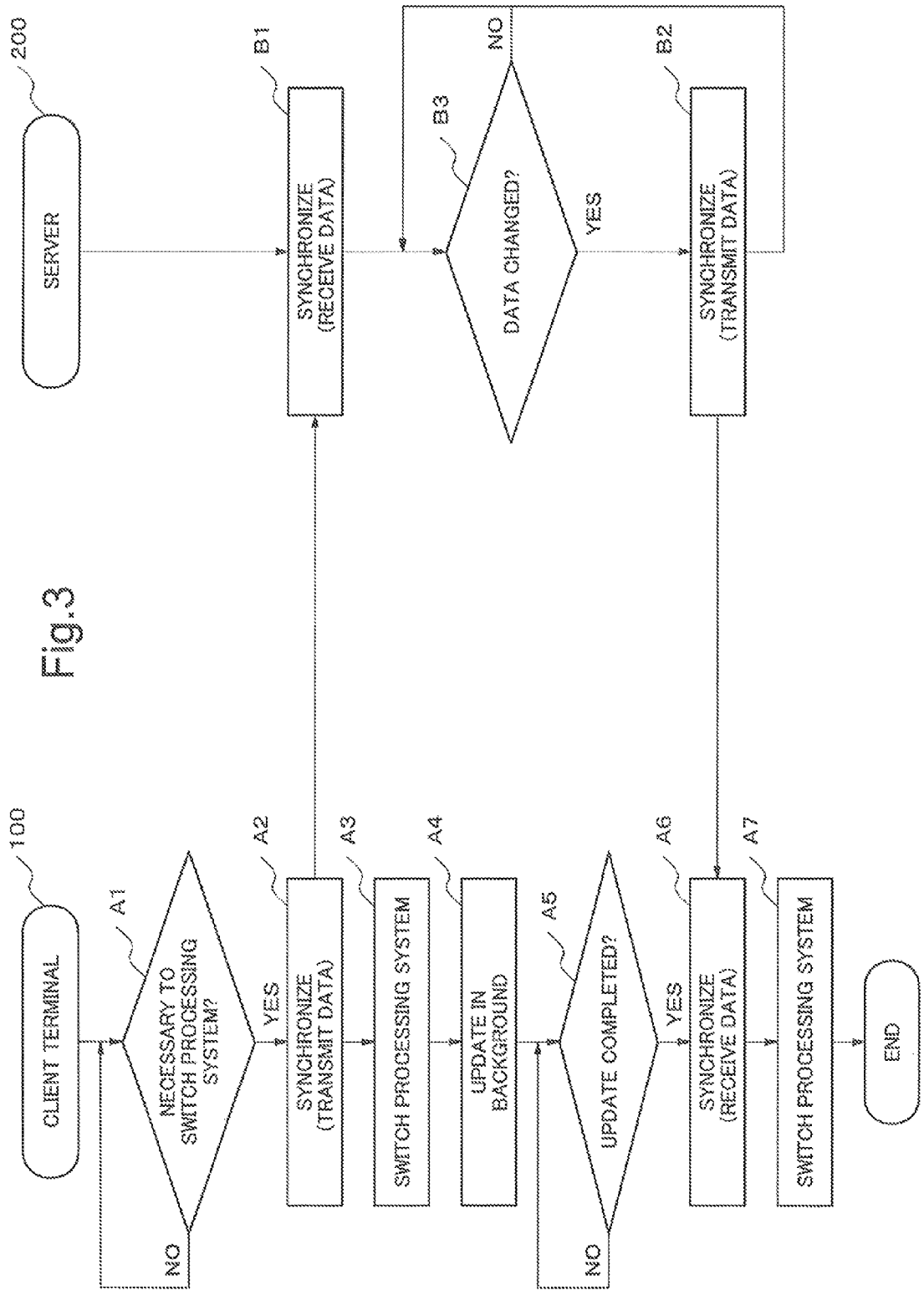

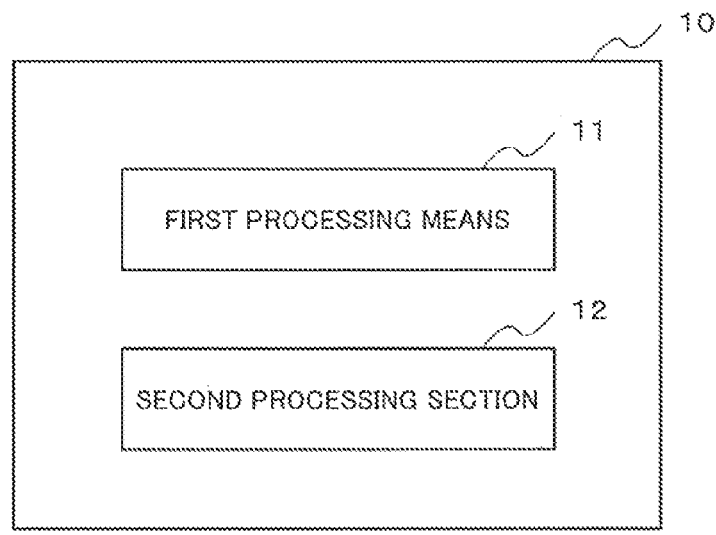

INFORMATION PROCESSING APPARATUS, INFORMATION PROCESSING SYSTEM, INFORMATION PROCESSING METHOD AND PROGRAM STORAGE MEDIUM

TECHNICAL FIELD

The present invention relates to an information processing apparatus, an information processing system, an information processing method and a program storage medium.

BACKGROUND ART

As one of information processing systems, there is a system which communicates between a client terminal and a server. In this information processing system, a processing system in the client terminal (for example, a operating system or a middleware) is an open architecture. As a result, to change of a processing system or to add an application are easy.

With such a development of a processing system becoming the open architecture, it is necessary to protect the processing system from a malicious third party, and to correct a defect of the processing system which is an abnormal state. Accordingly, it becomes necessary for a user to update frequently the processing system or to reinstall. To update the processing system is generally performed in the server and the client terminal (for example, PC (Personal Computer)). At present, also among mobile terminals (mobile communication terminal, portable terminal) such as a mobile phone, a terminal of which a processing system is an open architecture appeared. As for such mobile terminals, there are, for example, Android of Google Inc. and iPhone of Apple Inc. Therefore, in the future, it is expected that, even when the mobile terminal is used as a client terminal, a user needs to update the processing system.

In many cases, after updating the processing system or reinstalling it, it is necessary to restart. Users cannot use the processing system during the restart. For this reason, there is a problem that an application which operates based on the processing system cannot be used either during the restart. In the mobile terminal, it is desired that a user can always use, in particular, basic functions such as a telephone function and an electronic mail function. Therefore, same as the PC or the server, when a need arises for a user to frequently update the processing system in the mobile terminal, it increases that the basic function and so on cannot be used temporarily during the update operation (during restart). Accordingly, there is a concern that a usability of the mobile terminal may decline. Further, as the case when the processing system or the application which operates based on the processing system cannot be used, in addition to the case when the processing system is updated or the case when it is reinstalled mentioned above, for example, there is a case when abnormality occurs within the processing system or a case when a specific environment is reached.

A method to solve such a problem that a function of the client terminal cannot be used temporarily by updating the processing system is disclosed, for example, by Japanese Patent Application Laid-Open No. 2008-210071. In the method, the processing system becomes redundancy (duplicate) in either one of the client terminal or the server.

DISCLOSURE OF INVENTION

Technical Problem

However, in both cases, that is, in a case when the processing system in the server side becomes redundancy and in a case when the processing system in the client terminal side becomes redundancy, there is a following problem.

In the case when the processing system in the server side becomes redundancy, a user connects the client terminal to the server. As the client terminal, for example, there are a VNC (Virtual Network Computing) client, and a remote connection client such as a remote desktop (display transmission client). However, in a configuration of which the processing system becomes redundancy in the server side, it is assumed that it connects with a network continuously. For this reason, there is a problem that the user cannot use the processing system in an environment where the network cannot be used.

In the case when the processing system in the client terminal side becomes redundancy, it is necessary for the client terminal to include many resources such as memory and hard disk in order to become redundancy. However, the resource which can be mounted is restricted for a mobile terminal such as a cellular phone. For this reason, there is a problem that it is difficult to make the whole processing system become redundancy.

The present invention has been invented in the circumstances mentioned above. The main object is to provide an information processing apparatus, an information processing system, an information processing method and a program storage medium in which the application in the client terminal can be used continuously without being suspended temporarily.

Technical Solution

An information processing apparatus in the present invention, as a first aspect, communicates via a network with a server including a first processing section of second processing means which includes the first processing section and a second processing section, the information processing apparatus including:
first processing means; and
the second processing section, wherein
the first processing means switches processing means which executes an application to either of the first or the second processing means,
the second processing section executes a processing received from the first processing section, in case that the processing means is switched from the first processing means to the first processing section.

An information processing apparatus in the present invention, as a second aspect, communicates via a network with a client terminal including first processing means, the information processing apparatus including:
a first processing section which is included in second processing means including the first processing section and a second processing section, wherein
the first processing section switches processing means which executes an application to either of the first or the second processing means based on a direction from the client terminal,
the first processing section transmits a part of a processing to the client terminal in case that the processing means is switched from the first processing means to the second processing means.

An information processing system in the present invention including:
a client terminal which is the information processing apparatus as the first aspect of the present invention; and
a server which is an information processing apparatus as the second aspect of the present invention.

An information processing method in the present invention, in which a client terminal and a server communicate via a network and the client terminal includes first processing means and a second processing section which is included second processing means including a first processing section and the second processing section and the server includes the first processing section, the information processing method including:

switching processing means for executing an application to either of the first or the second processing means; and the second processing section executes a processing received from the first processing section in case that the processing means is switched from the first processing means to the first processing section.

A storage medium in the present invention, as a first aspect, stores a program which makes an information processing apparatus, which communicates via a network with a server including a first processing section of second processing means including a first processing section and the second processing section and includes first processing means and the second processing section, perform, a processing performed by the information processing apparatus including:

a processing which switches processing means which executes an application to either of the first or the second processing means; and a processing in which the second processing section executes a processing received from the first processing section in case that the processing means is switched from the first processing means to the first processing section.

A storage medium in the present invention, as a second aspect, stores a program which makes an information processing apparatus, which communicates via a network with a client terminal including first processing means and includes a first processing section on second processing means including a first processing section and the second processing section, perform, a processing performed by the information processing apparatus comprising:

a processing which switches processing means which executes an application to either of the first or the second processing means based on a direction from the client terminal; and a processing which transmits a part of a processing to the client terminal in case that the processing means is switched from the first processing means to the second processing means.

Advantageous Effects

According to the present invention, the effect in which the application in the client terminal can be used continuously without being suspended temporarily is obtained.

BRIEF DESCRIPTION OF DRAWINGS

FIG. 1 is a drawing which shows an example of a configuration of an information processing system according to one exemplary embodiment of the present invention.

FIG. 2 is a sequence chart showing an example of an operation of the information processing system according to one exemplary embodiment of the present invention.

FIG. 3 is a sequence chart showing an example of an operation of the information processing system according to one exemplary embodiment of the present invention.

FIG. 4 is a block diagram showing a configuration of an information processing system according to a second exemplary embodiment of the present invention.

MODE FOR CARRYING OUT THE INVENTION

A First Exemplary Embodiment

Hereinafter, an embodiment (exemplary embodiment) for carrying out the present invention will be described in detail with reference to the accompanying drawings.

First, an outline of an information processing system in the first exemplary embodiment will be described. In the information processing system of the first exemplary embodiment, a client terminal and a server can communicate with each other. This information processing system switches an application execution system from a processing system of the client terminal local to a processing system of the server main constituent, when an operating system or a middleware and so on of the client terminal is updated. The application execution system is the processing system executing an application in the client terminal.

A case when this information processing system switches as mentioned above is a case when an abnormality occurs in the operating system or the middleware and so on of the client terminal, or a case when a specific environment (such as position or time) is reached.

In this information processing system, by switching the processing system as mentioned above, the processing system of the client terminal local will continue to operate in the background. As a result, the information processing system can process the application switched from the client terminal in the server, while performing update processing or recovery processing from the abnormal state in the client terminal. Also, when switching the processing system, the information processing system synchronizes data between the processing systems. Thus, in the information processing system, the latest data is available even after the switching.

Next, a configuration of the information processing system in the first exemplary embodiment will be described with reference to FIG. 1. As shown in FIG. 1, the information processing system of the first exemplary embodiment includes a client terminal 100 and a server 200. The client terminal 100 and the server 200 can communicate via network 300.

The client terminal 100 includes a processing system 101 and a processing system 102. The client terminal 100 is an information processing apparatus which a user (operator) uses when receiving an information processing service provided by the processing system 101 or the processing system 102. As the client terminal 100, there are an electronic apparatus loaded in such as a car, a PC, a mobile phone, an electronic notepads, a PDA (Personal Digital Assistant), a game machine appliance, a wristwatch, a car navigation system and so on.

The server 200 is an information processing apparatus which provides the information processing service to a user of the client terminal 100. As the server 200, for example, same as the client terminal 100, there are an electronic apparatus loaded in such as a car, a PC, a mobile phone, an electronic notepads, a PDA, a game machine appliance, a wristwatch, a car navigation system and so on.

The client terminal 100 and the server 200 include a CPU (Central Processing Unit), a memory (for example, ROM (Read Only Memory), RAM (Random Access Memory)) and a communication device which are not illustrated. Also, the client terminal 100 and the server 200 may include one or more of a non-volatile memory device (for example, hard disk device), an input device (for example, keyboard, mouse and microphone) and an output device (for example, display and speaker). The client terminal 100 and the server 200 may include them externally or as built-in.

In the client terminal 100 and the server 200, by executing various control programs stored in the memory, the CPU realizes various functions of the client terminal 100 and the server 200. Further, the CPU may receive the control programs from other information processing apparatus via network 300 or may read them from a storage medium in which the control programs are stored in advance.

The network 300 is a communication path which connects the client terminal 100 and the server 200 so that they can communicate with each other. The network 300, or at least part of it, may be configured as a wireless communication path.

The client terminal 100 includes a processing system 101 as a first processing system (first processing means (unit))) and a part (second processing section) of a processing system 102 as a second processing system (second processing means (unit)). The server 200 includes a processing system 102 as a main part (first processing section) of the second processing system. By using either of the processing system 101 or the processing system 102, a user can receive the information processing service provided via an application 140 or an application 240.

The processing system 101 includes a general-purpose operating system 130, the application 140, a database 150, a client synchronization module 160, a switching module 170 and other file system which is not shown. The application 140 provides a service to a user. The database 150 stores data concerning the user. The processing system 101 is a processing system performing all the processing, which includes displaying for the user, in the client terminal 100.

As for the processing system 102, the client terminal 100 includes a part of its elements, and the server 200 includes other elements. The processing system 102 in the client terminal 100 includes a light client 220. The processing system 102 in the server 200 includes a general-purpose operating system 230, an application 240, a database 250, a server synchronization module 260, a light client reception application 270 and other file system which is not shown. In the processing system 102, the client terminal 100 and the server 200 are connected with each other via the light client 220 and the light client reception application 270 respectively. As for the processing system 102, a part of its processing such as displaying a processing result and receiving a directions from a user is executed by the client terminal 100. Other processing of the processing system 102 is executed by the server 200.

Switching between the processing system 101 and the processing system 102 is performed by working with the switching module 170 and the control system 110 of processing system 101. Further, the control system 110 can observe and collect environmental information. Among the environmental information, there are, for example, a GPS (Global Positioning System) position, current time, readable information by short-distance communication such as a RFID (Radio Frequency Identification) and so on.

In the client terminal 100, the processing system 101 is usually employed as a processing system (the application execution system) which executes an application. On the other hand, in the client terminal 100, for example, when the processing system 101 is updated or when abnormality occurs to processing system 101, the application execution system is switched from the processing system 101 to the processing system 102. In this case, the processing system 101 continuously updates or copes with abnormality in the background. Also, when the application execution system is switched from the processing system 101 to the processing system 102, the processing system 101,102 synchronize data. Thus, the switched execution processing system can use the latest data.

Further, as the general-purpose operating system 130 in the processing system 101, for example, Windows, Linux, Symbian and so on are used. Also, as the light client 220 in the processing system 102, for example, a VNC client which is a client operating a PC or a server in a remote location, a remote desktop client and so on are used. Also, as the light client 220, for example, a browser may be used.

Next, an example of operation of the information processing system in the first exemplary embodiment will be described with reference to FIG. 1 and FIG. 2. In this description, as an example, a schedule function will be described. A user refers to schedule data stored in the database 150 via the application 140 using the processing system 101 in the client terminal 100. As a result, the user can read his own schedule contents in the database 150, add or change the schedule and so on (hereinafter, referred to as a schedule function). Also, the user refers to schedule data stored in the database 250 via the application 240 using the processing system 102 in the client terminal 100 and the server 200. As a result, the user can read his own schedule contents in the database 250, add or change the schedule and so on (hereinafter, referred to as a schedule function). In other words, the user can use the schedule function using either of the processing system 101 or the processing system 102.

In this description, it is assumed that the user can use the schedule function by using the processing system 101 only as the application execution system. This state is called as a usual state. In the usual state, the user can use the schedule function even in a state when the client terminal 100 is not connected with the network 300.

In the usual state, the control system 110 of the client terminal 100 determines whether or not it is necessary to switch the processing system (Step A1). The control system 110 determines that it is necessary to switch the processing system, for example, when the operating system or the middleware and so on is updated or when abnormality occurs to the operating system or the middleware and so on. The control system 110 determines that it is necessary to switch the processing system also when the environmental information (for example, the position acquired using the GPS or current time) which the control system 110 is collecting periodically agrees with a numerical value set in advance.

In next description, it is assumed that it becomes necessary to update the general-purpose operating system 130 included in the processing system 101. According to the first exemplary embodiment, in such case, the following operation prevents that the user cannot use temporarily the processing system 101 and the application 140.

When it becomes necessary to update the general-purpose operating system 130, the control system 110 determines that it is necessary to switch the processing system (Step A1/YES). And the client synchronization module 160 and the server synchronization module 260 synchronize data (Steps A2 and B1). In this case, the client synchronization module 160 requests the server synchronization module 260 to receive data. As a result, a communication synchronizing data is begun. The client synchronization module 160 transmits the schedule data stored in the database 150 to the server synchronization module 260. The server synchronization module 260 receives the schedule data and stores it in the database 250. After that, the server synchronization module 260 notifies the client synchronization module 160 to have complete the reception. As a result, a communication synchronizing data ends. In this way, the client synchronization module 160 and the server synchronization module 260 synchronize data concerning the schedule data stored in the database 150 and 250 respectively. As a result, a part or all of the schedule data is kept in the same state in the database 150 and 250.

Next, the reason why synchronizing data as mentioned above will be described. In the usual state, the latest schedule data exists in the database 150 of the client terminal 100. After the processing system is switched from the processing system 101 to the processing system 102, the server 200 provides the schedule function. However, as mentioned above, the latest schedule data exists in the client terminal 100. Therefore, in order to update the latest schedule data in the database 250 of the server 200, it is necessary for the client terminal 100 and the server 200 to synchronize data mentioned above before the processing system is switched. That is, by synchronizing data, the server 200 changes the schedule data the same as the client terminal 100 has changed the schedule data up to switching the processing system. Thus, the server 200 is able to use the latest schedule data after switching.

After completion of synchronizing data, the client terminal 100 switches from the processing system 101 to the processing system 102 (Step A3). At this time, the switching module 170 directs the application 140 to end the operation. Also, the light client 220 transmits a direction to switch to the server 200 via the network 300. The direction to switch is a direction for switching the application execution system from the current the processing system 101 to the processing system 102. In other words, it is a direction for switching so that the schedule function provided by the application 140 of the client terminal 100 is to be provided by the application 240 of the server 200.

In the server 200, when the light client reception application 270 receives the direction to switch from the light client 220, the application 240 begins to provide the schedule function as the application execution system. As a result, to switch the processing system finishes. In the case, the user can use the schedule function by the processing system 102 as the application execution system while updating the general-purpose operating system 130 of the processing system 101. This state is called a switched state. Thus, according to the first exemplary embodiment, the problem that the user cannot use the application temporarily due to update the operating system can be prevented.

In the processing system 101, to update the general-purpose operating system 130 is executed in the background after the processing system is switched (Step A4). In this update, the client terminal 100 communicates with a server (supplier of a general-purpose operating system) other than the server 200. Also, in the foreground in Step A4, the light client 220 and the light client reception application 270 implement network communication. As a result, the schedule function provided by the application 240 is realized in the client terminal 100.

When updating the general-purpose operating system 130 in the background finishes in the switched state (Step A5/YES), the control system 110 determines that it is necessary to switch the processing system again. This switching processing is the processing which switches the application execution system from the processing system 102 to the processing system 101.

The client synchronization module 160 and the server synchronization module 260 synchronizes data again (Steps A6 and B2). At this time, the client synchronization module 160 requests the server synchronization module 260 to transmit data. As a result, the communication synchronizing data is begun. The server synchronization module 260 transmits the schedule data stored in the database 250 to the client synchronization module 160. The client synchronization module 160 receives the schedule data and stores the received schedule data in the database 150. After that, the client synchronization module 160 notifies the server synchronization module 260 to have complete the reception. As a result, the communication synchronizing data finishes. In this way, by the client synchronization module 160 and the server synchronization module 260 synchronize data, a part or all of the schedule data is kept in the same state in the database 150 and 250. Therefore, after the application execution system is switched from the processing system 102 to the processing system 101, the client terminal 100 can use the latest schedule.

After completion of synchronizing data, the processing system is switches from the processing system 102 to the processing system 101 (Step A7). At this time, the application 140 resumes by the switching module 170. Also, the light client 220 transmits a direction to switch to the server 200 via the network 300. The direction to switch is a direction for switching the application execution system from the current the processing system 102 to the processing system 101. In other words, it is a direction for switching so that the schedule function provided by the application 240 of the server 200 is to be provided by the application 140 of the client terminal 100. In the server 200, when the light client reception application 270 receives the direction to switch from the light client 220, the application 240 suspends providing the schedule function. As a result, to switch the processing system finishes. At this time, the user can use the schedule function with only the processing system 101 as the application execution system. By the operation mentioned above, the information processing system returns to the usual state.

Above is the example of operation in the information processing system of the first exemplary embodiment. Further, in the description mentioned above, when the processing system is switched, the processing systems synchronize data. In contrast, whenever data is changed, the processing systems may synchronize data. FIG. 3 is a flow chart showing the operation in this case. In the FIG. 3, same code is assigned to the same step as the FIG. 2, and the description about the same step is omitted here. In the FIG. 3, after switching from the processing system 101 to the processing system 102 (after Step A3), whenever the database 250 is changed in the server 200 (Step B3/YES), the server synchronization module 260 and the client synchronization module 160 synchronize data (Steps B2 and A6). In other words, after being switched to the processing system 102, it is supposed that a user changes the schedule data using the schedule function provided by the application 240 (step B3/YES). As a result, the changed schedule data is processed as follows. That is, the changed schedule data is stored in the database 250 and, at the same time, is transmitted to the client terminal 100 (Step B2), and is stored in the database 150 (Step A6).

Further, in the information processing system of the first exemplary embodiment, the control system 110 may be configured so that a minimum function required for the processing system 102 such as a network function may be included. As a result, even in a case the general-purpose operating system 130 of the processing system 101 cannot be used, the function can be executed with only the processing system 102 and the control system 110.

Also, in the information processing system of the first exemplary embodiment, it is sufficient for the control system 110 to include a function which provides to the processing system 101 a resource accessing to the client terminal 100 or a minimum function which controls the processing system 101 and the processing system 102.

As has been described above, according to the first exemplary embodiment, the following effect can be achieved.

A first effect is the effect that, in the case of updating the operating system of the client terminal or of an abnormality in the operating system, the processing system for executing an application can be switched from the processing system of the client terminal local to the processing system of the server main constituent and the latest data can be used continuously in the switched processing system. The reason is because the client terminal includes two processing systems for executing the application, and in the case of updating one processing system or of abnormality, other processing system can be used. Also, when the processing system is switched, the information processing system synchronizes data between two processing systems. Accordingly, the latest data which was being used before switching can be used continuously also in the processing system after switching.

A second effect is the effect that, the processing system which executes an application, after being switched from the processing system of the client terminal local to the processing system of the server main constituent, can operate as follows. That is, while the processing system of the server main constituent processes, the processing system of the client terminal local can update or recover an abnormal state in the background. The reason is because the processing system of the client terminal local and the processing system of the server main constituent are configured as independent processing system in a control system.

A third effect is the effect that, also in the mobile terminal such as a cellular phone or a PDA in which a resource is restricted, a redundant system of a system can be configured with resource saving. The reason is because, the processing system in the server side of two processing systems in the client terminal can be a light processing system which inputs and outputs only.

A fourth effect is the effect that a user can use an appropriate processing system according to a situation by a control system switching two processing systems using environmental information (for example, location information or current time and so on). For example, a user can use the processing system of the client terminal local when the user is inside a company, and, can use the client terminal as a thin client terminal when the user goes out of the company. The reason is because the control system can switch the processing system from the processing system of the client terminal (local) to the processing system of the server main constituent by utilizing sensor information such as a GPS or a Felica as a trigger. Also, a user can secure easily security outside of the company. When switching to the processing system of the server main constituent, the user may erase data of the client terminal.

A Second Exemplary Embodiment

FIG. 4 is a block diagram showing a configuration of an information processing apparatus 10 according to the second exemplary embodiment. As shown in the FIG. 4, the information processing apparatus 10 communicates via a network with a server including a first processing section which is includes in a second processing system with a second processing section. The information processing apparatus 10 includes a first processing system 11 and a second processing section 12. The first processing system 11 switches the application execution system to either of the first or the second processing system. The second processing section 12 executes a processing received from the first processing section when the application execution system is switched from the first processing system to the first processing section.

As stated above, according to the second exemplary embodiment, the effect that there are no cases when the application of the client terminal is suspended temporarily for its use, and the user can use the client terminal continuously can be obtained.

Although the present invention has been described with reference to the exemplary embodiment above, the present invention is not limited to the above-mentioned exemplary embodiment. It will be understood by those of ordinary skill in the art that various changes in form and details may be made therein without departing from the spirit and scope of the present invention as defined by the claims.

For example, the operation in the exemplary embodiment mentioned above may be executed by hardware, software, or a compound configuration of both of them.

In a case when is processed by software, a program in which processing sequence is stored may be installed in a memory in a computer included in special purpose hardware and executed. Or, the program may be installed in a general-purpose computer which can execute various processing and executed.

For example, the program may be stored in a hard disk or a ROM (Read Only Memory) as a storage medium in advance. Or, the program may be stored (recorded) temporarily or permanently in a removable storage medium such as a CD-ROM (Compact Disc Read Only Memory), an MO (Magneto optical) disk, a DVD (Digital Versatile Disc), a magnetic disk and a semiconductor memory. Such the removable storage medium may be provided as so-called packaged software.

Further, the program may be installed to the computer from the removable storage medium mentioned above or may be transmitted to the computer from a download site by wireless. Or, it may be transmitted to the computer by a wire via a network such as a LAN (Local Area Network) or the internet. The computer may receive the transmitted program and install it in the storage medium such as a built-in hard disk.

Also, the system which is described in the exemplary embodiment mentioned above can be configured so as to process not only chronologically following the procedure described in the exemplary embodiment mentioned above, but also in parallel or separately according to the processing capability of the apparatus which executes processing or based on the needs.

Also the system described in the exemplary embodiment mentioned above may be configured as a logical set of a plurality of apparatuses or may be configured by intermixing the function of each apparatus.

An information processing apparatus of the present invention is, as a first aspect, an information processing apparatus which is used as a client terminal including a first processing system and which communicates via a network with a server including a second processing system. This information processing apparatus switches the application execution system from the first processing system to the second processing system, and switches the application execution system from the second processing system to the first processing system.

The information processing apparatus of the present invention is, as a second aspect, the information processing apparatus which is used as a server including the second processing system, and which communicates via a network with a client terminal including the first processing system. This information processing apparatus switches the application execution system from the first processing system to the second processing system, and switches the application execution system from the second processing system to the first processing system based on a direction from the client terminal.

An information processing system of the present invention includes the information processing apparatus which is the first aspect of the present invention as a client terminal and includes the information processing apparatus which is the second aspect of the present invention as a server.

An information processing method of the present invention is the information processing method in which a client terminal including the first processing system and a server including the second processing system communicate via a network; and switches the application execution system from the first processing system to the second processing system, or switches the application execution system from the second processing system to the first processing system.

A program of the present invention is, as a first aspect, a program for a client terminal which includes the first processing system and communicates via a network with a server including the second processing system. This program makes a computer execute a processing which switches the application execution system from the first processing system to the second processing system or a processing which switches the application execution system from the second processing system to the first processing system.

A program of the present invention is, as a second aspect, a program for a server which includes the second processing system and communicates via a client terminal including the first processing system. This program makes a computer execute a processing which switches the application execution system from the first processing system to the second processing system or a processing which switches the application execution system from the second processing system to the first processing system based on a direction from the client terminal.

Further, this application is based upon and claims the benefit of priority from Japanese Patent Application No. 2009-036483, filed on Feb. 19, 2009, the disclosure of which is incorporated herein in its entirety by reference.

INDUSTRIAL APPLICABILITY

The present invention can be applied to an apparatus, a device, a system, a method and a program and so on which need to switch a main constituent which executes an application according to the case.

EXPLANATION OF REFERENCES 100 client terminal, 101 processing system (first processing system), 102 processing system (second processing system), 110 control system, 130 general-purpose operating system, 140 application, 150 database, 160 client synchronization module, 170 switching module, 200 server, 220 light client, 230 general-purpose operating system, 240 application, 250 database, 260 server synchronization module, 300 network

The invention claimed is:

1. An information processing apparatus which communicates via a network with a server, the information processing apparatus comprising:
a first processing unit; and
a second processing section which functions as part of a second processing unit included in the server and executing a processing instead of the first processing unit, wherein
the first processing unit switches a processing unit which executes an application to either of the first or the second processing unit, and
the second processing section has a function which communicates information with the server via the network, in case of switching from the first processing unit to the second processing unit and displays a result of the processing executed on the second processing unit in the server,
wherein the first processing unit executes a processing other than the application in case that the first processing unit switches the processing unit from the first processing unit to the second processing unit,
wherein switching from the first processing unit to the second processing unit is performed in case of updating an operating system or a middleware executed by the first processing unit, and
wherein the first processing unit updates the operating system or the middleware as a processing other than the application.

2. An information processing apparatus which communicates via a network with a server, the information processing apparatus comprising:
a first processing unit; and
a second processing section which functions as part of a second processing unit included in the server and executing a processing instead of the first processing unit, wherein
the first processing unit switches a processing unit which executes an application to either of the first or the second processing unit, and
the second processing section has a function which communicates information with the server via the network, in case of switching from the first processing unit to the second processing unit and displays a result of the processing executed on the second processing unit in the server,
wherein the first processing unit executes a processing other than the application in case that the first processing unit switches the processing unit from the first processing unit to the second processing unit,
wherein switching from the first processing unit to the second processing unit is performed in case that abnormality occurs to an operating system or a middleware executed by the first processing unit, and
wherein the first processing unit executes a recovery processing from the abnormality as a processing other than the application.

3. An information processing apparatus which communicates via a network with a client terminal, the information processing apparatus comprising:
a second processing unit which executes a processing instead of the first processing unit included in the client terminal, wherein
the second processing unit switches a processing unit which executes an application to either of the first or the second processing unit based on a direction from the client terminal, and
the second processing unit transmits a result of a processing to the second processing unit of the client terminal in case of switching from the first processing unit to the second processing unit,
wherein switching from the first processing unit to the second processing unit is performed in case of updating an operating system or a middleware executed by the first processing unit.

4. An information processing apparatus which communicates via a network with a client terminal, the information processing apparatus comprising:
    a second processing unit which executes a processing instead of the first processing unit included in the client terminal, wherein
    the second processing unit switches a processing unit which executes an application to either of the first or the second processing unit based on a direction from the client terminal, and
    the second processing unit transmits a result of a processing to the second processing unit of the client terminal in case of switching from the first processing unit to the second processing unit,
    wherein switching from the first processing unit to the second processing unit is performed in case that abnormality occurs to an operating system or a middleware executed by the first processing unit.

\* \* \* \* \*